Figure 1:
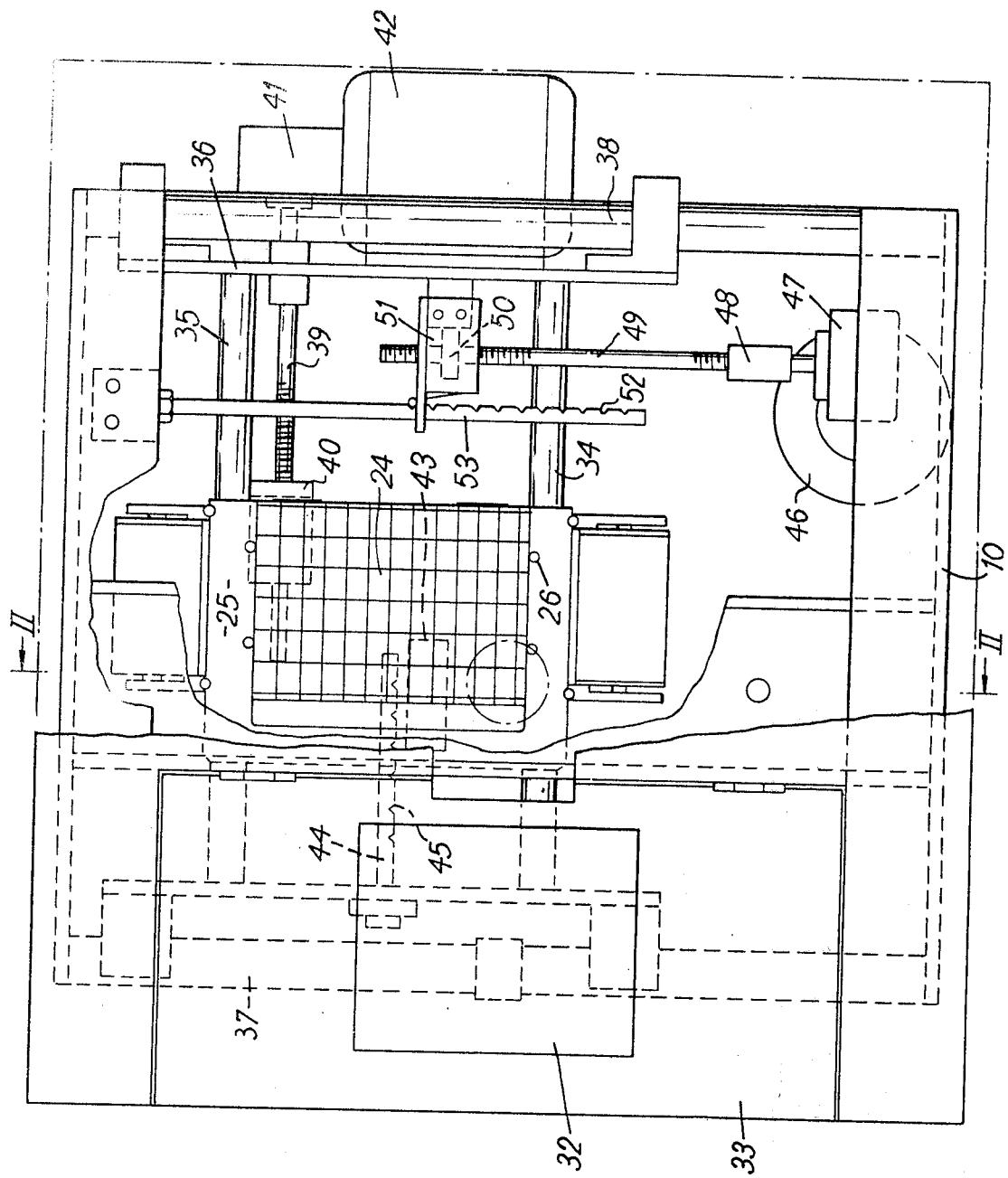

United States Patent [19]

Goodliffe

[11] 3,907,426

[45] Sept. 23, 1975

[54] MICROFICHE PRINTER

[76] Inventor: Ronald Thomas Goodliffe, Westmarch, 61 Lansdowne Rd., West Worthing, Sussex, England

[22] Filed: Apr. 10, 1974

[21] Appl. No.: 459,514

[30] Foreign Application Priority Data
Apr. 13, 1973 United Kingdom............... 18004/73

[52] U.S. Cl. ...................... 355/53; 353/27; 355/54
[51] Int. Cl.² .................... G03B 21/18; G03B 21/26
[58] Field of Search .................... 355/53, 54; 353/27

[56] References Cited
UNITED STATES PATENTS
3,733,126 5/1973 Brownscombe........................ 355/54
3,778,151 12/1973 Zimmet............................. 355/54 X Primary Examiner—Richard A. Wintercorn
Attorney, Agent, or Firm—Woodhams, Blanchard and Flynn

[57] ABSTRACT

Apparatus for forming microfiche from microfilm comprises a projection system for projecting images from the microfilm on to fiche material supported on a table. First and second drive means are provided for displacing the table along two perpendicular axes to locate the areas on which an image is to be formed in alignment with the projection system. For each of the two axes of movement of the table there is a sensing element moving with the table which co-operates with a fixed bar having markings at regular intervals corresponding to the required spacing of the images on the fiche. The sensing element is connected to the first or second drive means to stop the movement of the table each time the sensing element senses a marking on the bar.

12 Claims, 5 Drawing Figures

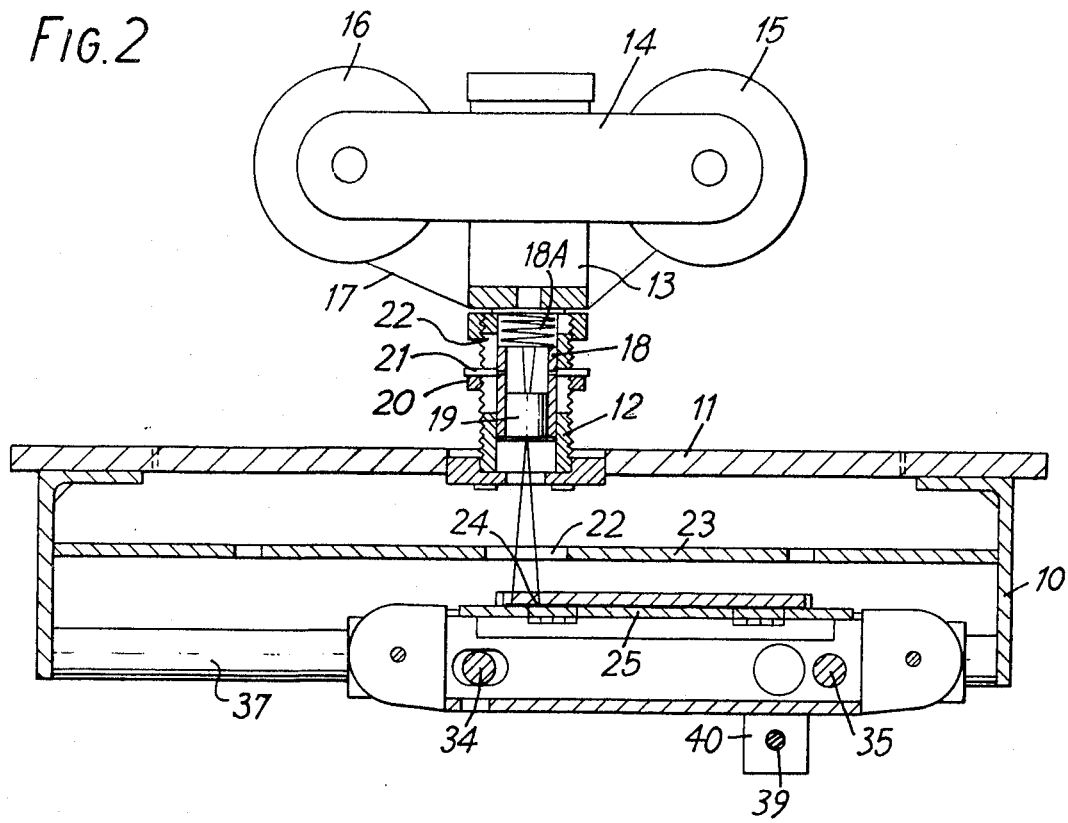
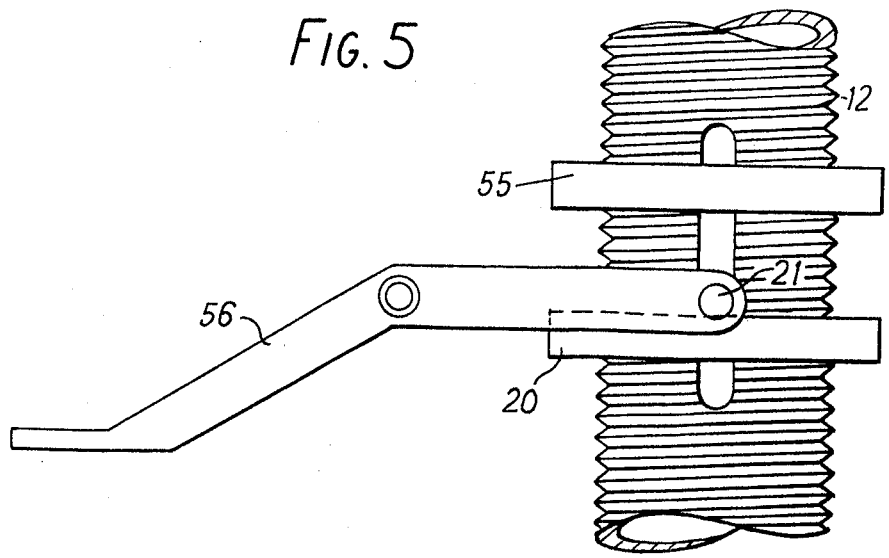

MICROFICHE PRINTER

The present invention relates to a photographic printing machine for the production of microfiche.

The reproduction of copies of microfiche from an original or master copy can be effected by well-known techniques. The production of the original fiche by photography from documents which are to be recorded requires the use of large and expensive machines in order to form the reduced images of the documents without distortion and to position these images accurately on the fiche. Moreover, such machines are normally only capable of producing one type of fiche whereas there are now several types in use having different numbers of images on the fiche and different spacings of these images.

By contrast, microfilm cameras are relatively simple and easily available. Furthermore, there is a demand for transfer to microfiche of records current held on microfilm and at present this can only be met either by going back to the original documents and recording them by means of a microfiche camera or by cutting the microfilm, rearranging the frames in a microfiche format and contact printing from the rearranged frames.

Accordingly, the present invention provides apparatus for forming a microfiche from microfilm comprising a projection system for projecting images from the microfilm, a table for supporting fiche material, and first and second drive means for displacing the table along two perpendicular axes to locate the area on which an image is to be recorded in alignment with the projection system, wherein for each of the two axes of movement of the table there is a sensing element movable with the table which co-operates with a fixed bar having markings at regular intervals corresponding to the required spacing of the images on the fiche, the sensing element being connected to the first or second drive means to stop the movement of the table each time the sensing element senses a marking on the bar. The projection system is preferably adjustable to scale the image to the exact size required and this adjustment may allow for 16 mm or 35 mm microfilm to be used as the source material. The system may also be used for making fiche from aperture cards and other kinds of transparent images. The projection system preferably also allows rotation of the image both for correction of errors of angular position and for turning an image through 90° where it was on its side in the original book or other document. Conveniently, a mirror which is used as a shutter between the projection system and the fiche throws the projected image onto a screen to assist the operator in scaling and rotating the image before it is recorded on the fiche.

The method adopted for positioning the table carrying the fiche is to use fixed bars having notches at intervals which determine the correct positions for the images on the fiche. These notches are sensed by a feeler which operates a switch to bring the table rapidly to a stop after the engagement of the feeler with one of the notches. When the table is driven by an A.C. motor the required rapid braking can be obtained by injecting D.C. into the motor.

Figure 3:
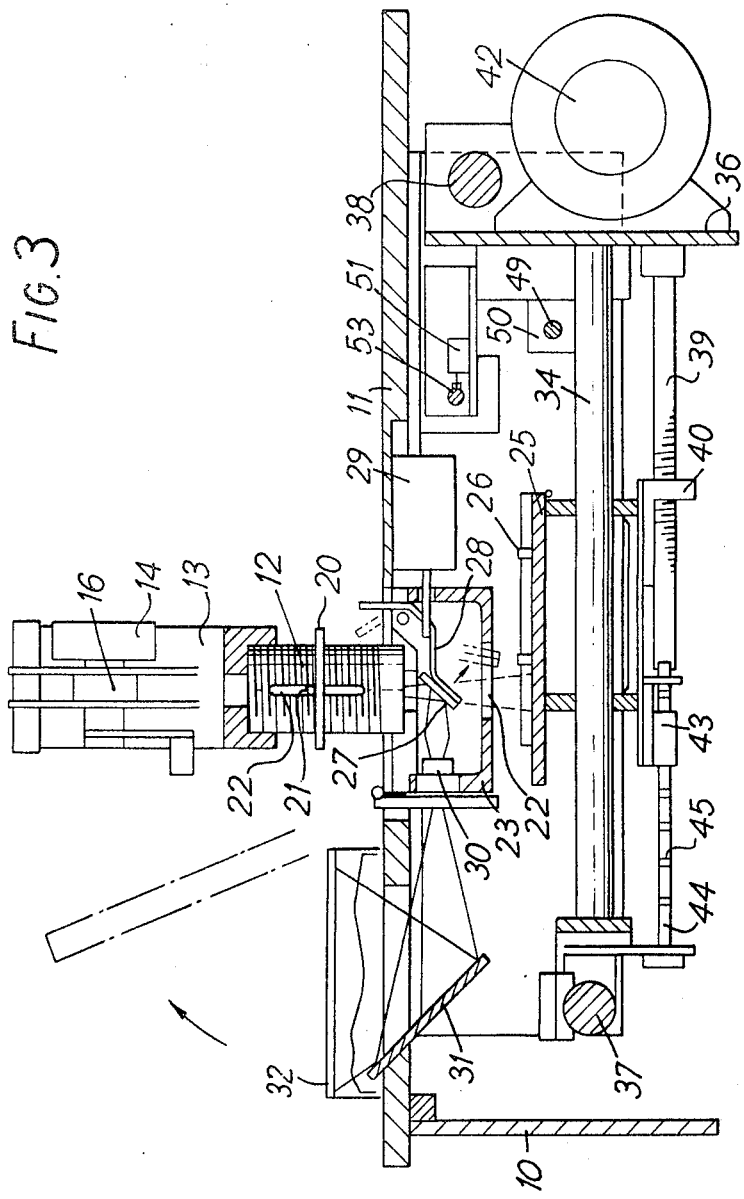
Figure 4:
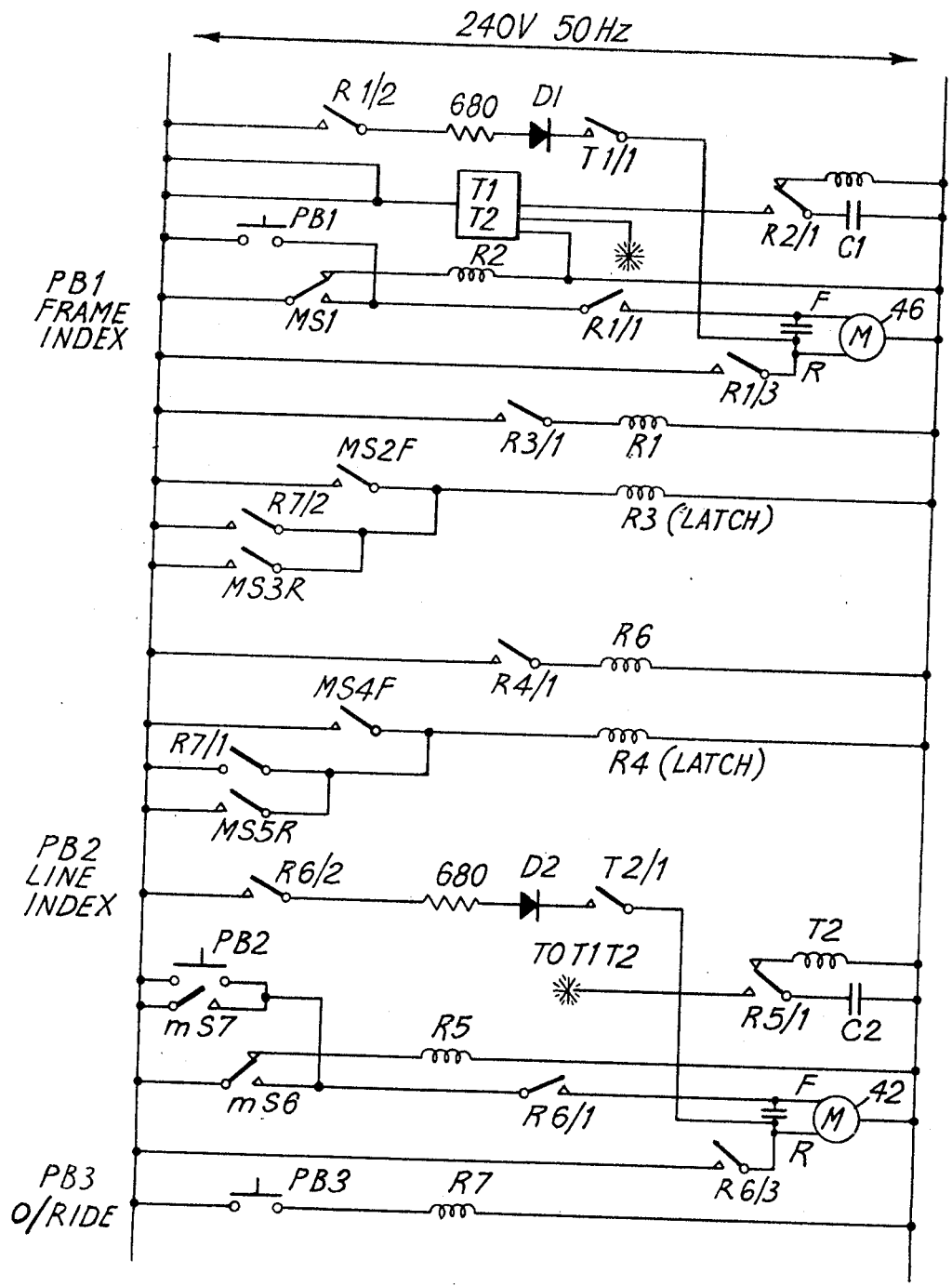

The invention will be described in more detail with the aid of an example illustrated in the accompanying drawings, in which:

FIG. 1 is a plan view of a printing machine in accordance with the invention, with parts cut away, FIG. 2 is a section on the line II—II of FIG. 1, FIG. 3 is a section in a plane at right angles to that of FIG. 2, FIG. 4 is a circuit diagram for the control of the table movement, and FIG. 5 shows a modification of part of the printing machine of FIG. 1.

The machine has a frame 10 which supports a top plate 11. Carried by the top plate 11 is a vertical support tube 12 and mounted on the tube 12 is a housing 13 containing a lamp (not shown). Arms 14 extending from the housing 13 support reels 15 and 16 between which a length of microfilm 17 extends. Within the support tube 12 there is a lens tube 18 which carries a projection lens system 19. The support tube 12 is externally threaded and carries an adjusting ring 20 on which rest two pins 21 projecting from the lens tube 18 through vertical slots 22 in the tube 12. The projection lens system 19 is normally arranged to give approximately a one-to-one magnification ratio but by means of the adjusting ring 20 the size of the projected image can be varied over a range of 2:1 to 1:2. When the magnification ratio is altered, the height of the microfilm has also to be altered to keep the image in focus.

The projected beam from the lens system 19 can pass by way of an opening 22 in a channel section member 23 to fall on a microfiche 24 carried on a table 25 on which it is accurately positioned by means of registration pins 26. A mirror 27 carried on a swinging arm 28 acts as a shutter which only allows the beam to fall on the fiche when the mirror is swung to the position shown in broken lines in FIG. 3. Actuation of the arm 28 carrying the mirror 27 is effected by means of a solenoid 29. When the mirror 27 is in its full-line position the projected beam is directed by way of a further lens 30 and mirror 31 into a ground glass screen 32. The image on the screen 32 is used by the operator to make any necessary adjustments to the projection system before an image is recorded on the fiche. Scaling is effected by means of the adjusting ring 20 which raises the lens tube 18 against a spring 18A. The housing 13 is rotatable on the tube 12 to allow rotation of the image.

The mirror 31 and screen 32 are carried by a hinged flap 33 which can be lifted as shown in broken lines to allow access to the mechanism below the top plate 11.

The table 25 is slidably mounted on horizontal rails 34 and 35 of a carriage 36 which, in turn, is slidable on rails 37 and 38 on the frame 10 which are perpendicular to the rails 34 and 35. Movement of the table 25 on the rails 34 and 35 is effected by a lead screw 39 which engages with a block 40 on the table and which is driven through a reduction gear 41 by an electric motor 42, the reduction gear and motor being mounted on the carriage 36. A micro-switch 43 carried by the table co-operates with a rod 44 which is fixed to the carriage 36 and is provided with notches 45. Each time the sensing arm of the micro-switch 43 drops into a notch 45 the operation of the switch causes braking of the driving motor 42 by feeding D.C. instead of A.C. to the winding. The table 25 is thus brought to a halt at the exact position required (allowance can be made for the braking distance, which will be the same in each case).

The movement of the carriage 36 on the rails 37 and 38 is effected by an electric motor 46 fixed to the frame 10 which, through a reduction gear 47 and a flexible coupling 48, drives a lead screw 49 which engages a block 50 on the carriage. The carriage 36 also carries a micro-switch 51 which co-operates with the notches 52 of a fixed bar 53.

The notched bars 44 and 53 are easily removed and replaced with bars having different notch spacings thus enabling different numbers of images to be recorded on the fiche with accurate positioning of the images for each type of fiche.

Alternatively the bars 44 and 53 may be of square section with different series of notches on their four faces so that a change in the format of the fiche requires only rotation of the two bars.

The table 25 is equipped with rollers 54 at each end over which a continuous band of microfiche material can be passed from a reel (not shown) and carried below the table. Whereas individual cut pieces of microfiche material could be placed on the table one at a time, it is more convenient to be able to unwind a fresh length of material from the reel.

A circuit diagram for the control of the movements of the table 25 is shown in FIG. 4. The circuit diagram shows the switches and relays in the positions which they occupy when the table 25 has been halted in a desired position by the engagement of the micro-switches 43 and 51 with notches in the bars 44 and 53. The microswitch 51 is identified as MS1 in the circuit diagram and the micro-switch 43 is identified as MS6. Under these conditions a latch relay R3 is energised and the contacts R3/1 are closed to energise a relay R1 as a result of which contacts R1/1 and R1/2 are closed and R1/3 is open. Depression of the push button PB1 will therefore supply current to the "forward" terminal F of the motor 46 to advance the table in the forward direction in order to move on to the next frame in a line. MS1 will thus be lifted out of the notch in the bar and will change over to a position in which it maintains the supply of current to the terminal F after PB1 has been released.

The change-over of MS1 de-energises R2 and causes the contacts R2/1 to close, thus connecting a capacitor C1 in series with a charging circuit T1/T2 across the supply terminals. The circuit T1/T2 rectifies the supply and charges up the capacitor C1. When MS1 drops into the next notch and again changes over to energise R2 the supply of A.C. to the motor 46 is broken and the capacitor C1 is discharged through a winding T1 to hold contacts T1/1 closed for a limited period. This allows D.C. to flow by way of contacts R1/2, a 680 ohm resistor and a diode D1 to the reverse terminal R of the motor 46, thus effecting rapid braking.

This sequence is then repeated until the end of a line is reached whereupon a micro-switch MS3R is triggered to switch over the latch relay R3 to a de-energised state, thus de-energising R1, opening R1/1 and R1/2 and closing R1/3. A.C. is thereby fed to the terminal R of the motor 46 to return the table to the beginning of the line. Here a micro-switch MS2F is triggered to re-energise the latch relay R3 and thus return the circuit to a condition in which it is ready for forward movement again.

A push button PB2 serves to initiate indexing from line to line in a manner exactly analogous to the indexing from frame to frame effected by the push button PB2. Corrsponding to the elements PB1, MS1, MS2F, MS3R, R1, R1/1, R1/2, R1/3, R2, R2/1, R3, R3/1, T1, T1/1, C1, T1/T2, D1, and 46 for frame indexing are the elements PB2, MS6, MS4F, MS5R, R6, R6/1, R6/2, R6/3, R5, R5/1, R4, R4/1, T2, T2/1, C2, T1/T2, D2, and 42, respectively, for line indexing and these elements have equivalent functions. It will be noted that the charging circuit T1/T2 is common to the capacitors C1 and C2.

Automatic line indexing at the completion of each line is provided by a micro-switch MS7 in parallel with PB2 which is operated at the same time as MS3R. Thus PB2 is only required for indexing from line to line when the table is stopped in the middle of a line.

The circuit is additionally equipped with an over-ride push button PB3 which, when depressed, energises a relay coil R7 and closes contacts R7/1 and R7/2. Operation of these contacts has the same effect as triggering MS5R and MS3R, respectively, and thus returns the table to the beginning of the first line from whatever position it may be at.

In an alternative arrangement for producing an image on the screen 32, the further lens 30 is omitted and the image on the screen 32 is produced by the projection lens system 19, which is adjusted to bring this image into focus. After the operator has completed the positioning and sealing of the image on the screen 32, the lens system 19 is readjusted to bring the image on the fiche into focus. This can be effected by including a second adjusting ring 55 on the support tube 12 at a position in which the lens tube 18 is focused on the screeen 32. The pins 21 may be slid in the slots 22 between the two adjusting rings by means of a handle 56 to alter the focus of the lens tube 18. A catch (not shown) can be provided to hold the pins 21 adjacent the upper of the two adjusting rings.

The adjustment between the two focused positions of the lens tube may also be made using a cam (not shown) designed to effect the necessary adjustment.

I claim:

1. Apparatus for forming microfiche from microfilm comprising projection means for projecting images from said microfilm, a table for supporting fiche material, and first and second drive means for displacing said table along two perpendicular axes to locate the areas on which an image is to be recorded in alignment with said projection means, wherein there is provided for each of said axes sensing means, a bar co-operating with each said sensing means and markings on each said bar at regular intervals corresponding to the required spacing of the imagess on said fiche, each said bar having a plurality of series of said markings corresponding to different fiche formats, one of said sensing means and said bar being mounted for movement with said table and the other being fixed and said sensing means being connected to said first or said second drive means to stop the movement of said table each time said sensing means senses a marking on said bar.

2. The apparatus of claim 1 wherein each of said sensing means includes a feeler which engages the corresponding said bar and a switch operable by said feeler.

3. The apparatus of claim 2 in which said markings are in the form of notches into which said feeler drops.

4. Apparatus for forming microfiche from microfilm comprising projection means for projecting images from said microfilm, a table for supporting fiche material, a mirror between said projection means and said table, said mirror acting as a shutter, a viewing screen for receiving a projected image directed on to said screen when said shutter is in a closed position, said shutter allowing the image to fall on said tabe in its open position, and first and second drive means for displacing said table along two perpendicular axes to locate the areas on which an image is to be recorded in alignment with said projection means, wherein there is provided for each of said axes sensing means, a bar co-operating with each said sensing means and markings on said bar at regular intervals corresponding to the required spacing of the images on said fiche, one of said sensing means and said bar being mounted for movement with said table and the other being fixed, and said sensing means being connected to said first or said second dirve means to stop the movement of said table each time said sensing means senses a marking on said bar.

5. The apparatus of claim 4 wherein said projection means includes a lens, and a cam for adjusting said lens between two positions in one of which positions the image on said screen is in focus and in the other of which positions the image on said fiche is in focus.

6. Apparatus for forming microfiche from microfilm comprising projection means for projecting images from said microfilm, a table for supporting fiche material, first and second drive means for displacing said table along two perpendicular axes to locate the areas on which an image is to be recorded in alignment with said projection means, wherein there is provided for each of said axes sensing means, a bar co-operating with said sensing means and markings on said bar at regular intervals corresponding to the required spacing of the images on said fiche, one of said sensing means and said bar being mounted for movement with said table and the other being fixed, and said sensing means being connected to said first or said second drive means to stop the movement of said table each time said sensing means senses a marking on said bar, and wherein each of said first and second drive means comprises an A.C. motor and said sensing means are connected to effect injection of D.C. into the winding of said motor in the reverse direction to effect rapid braking of said motor.

7. The apparatus of claim 6, wherein each of said sensing means includes a feeler which engages the corresponding said bar and a switch operable by said feeler, and said markings are in the form of notches in to which said feeler drops.

8. The apparatus of claim 7, wherein said bar has a plurality of series of notches corresponding to different fiche formats.

9. The apparatus of claim 1 wherein said first drive means comprises an electric motor, a lead screw and a reduction gear, said motor driving said lead screw through said reduction gear, said apparatus including a carriage for receiving said table slidably mounted thereon, said lead screw being coupled to drive said carriage, and said second drive means is mounted on said carriage and comprises a second electric motor and a lead screw, said second motor driving said table through said lead screw.

10. Apparatus for forming microfiche from microfilm comprising projection means for projecting images from said microfilm, a table for supporting fiche material, and first and second drive means for displacing said table along two perpendicular axes to locate the areas on which an image is to be recorded in alignment with said projection means, wherein there is provided for each of said axes sensing means movable with said table, a fixed bar co-operating with said sensing means and notches on said bar at regular intervals corresponding to the required spacing of the images on said fiche, said sensing means comprising a feeler, and a switch connected to said first or said second drive means to stop the movement of said table each time said feeler senses a notch on said bar, said apparatus including a mirror between said projection means and said table, acting as a shutter, and a viewing screen for receiving a projected image directed onto said screen when said shutter is in a closed position, said shutter allowing the image to fall on said table in its open position.

11. The apparatus of claim 10 wherein said first drive means comprises an electric motor, a lead screw and a reduction gear, said motor driving said lead screw through said reduction gear, said apparatus including a carriage for receiving said table slidably mounted thereon, said lead screw being coupled to drive said carriage, and said second drive means is mounted on said carriage and comprises a second electric motor and a lead screw, said second motor driving said table through said lead screw.

12. The apparatus of claim 10 wherein said projection means includes a lens, and a cam for adjusting said lens between two positions in one of which positions the image on said screen is in focus and in the other of which positions the image on said fiche is in focus.

* * * * *